Oct. 6, 1964    G. D. BURRELL    3,151,920
SANITARY HOLDER FOR SERVING AND STORING A PROCESSED FOOD BAR
Filed April 15, 1963    2 Sheets-Sheet 1
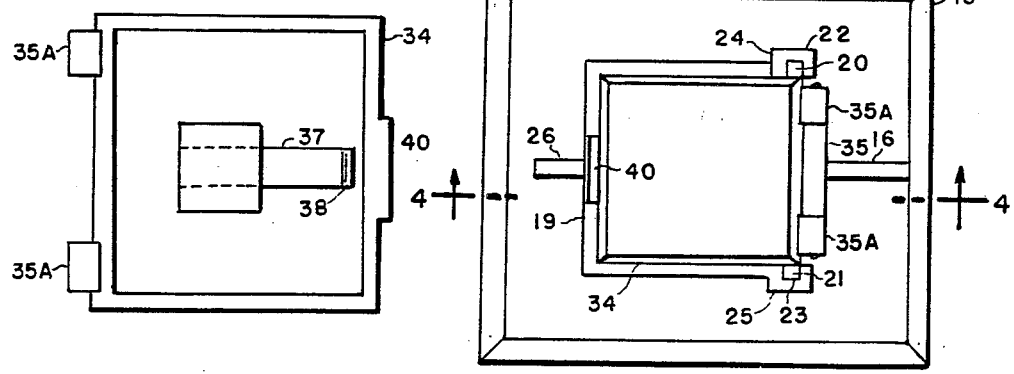
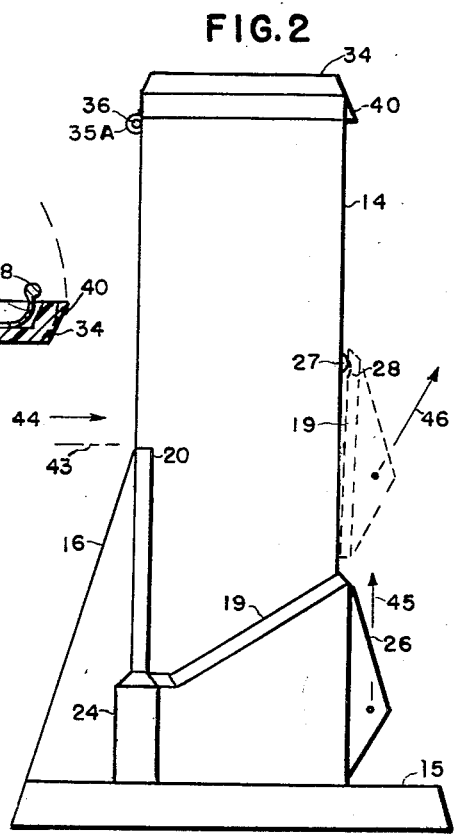
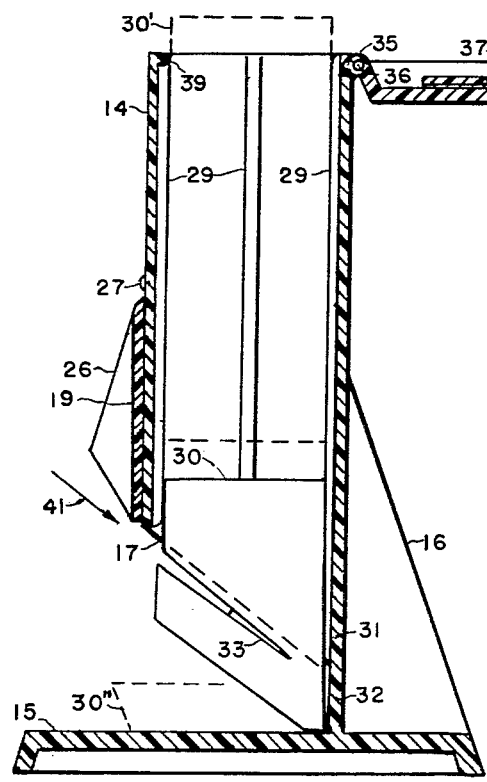
*INVENTOR.*
GARY DEE BURRELL
BY
*Achilles B. George*
ATTORNEY Oct. 6, 1964  G. D. BURRELL  3,151,920
SANITARY HOLDER FOR SERVING AND STORING A PROCESSED FOOD BAR
Filed April 15, 1963  2 Sheets-Sheet 2
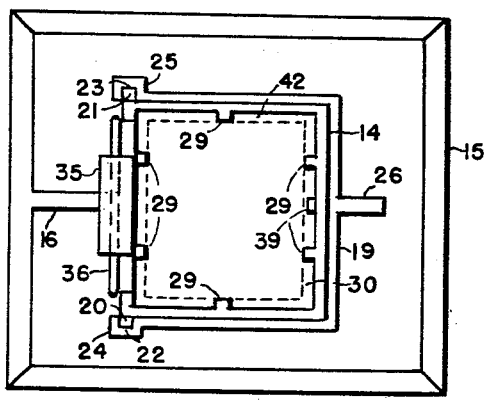
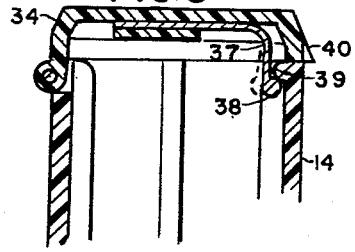
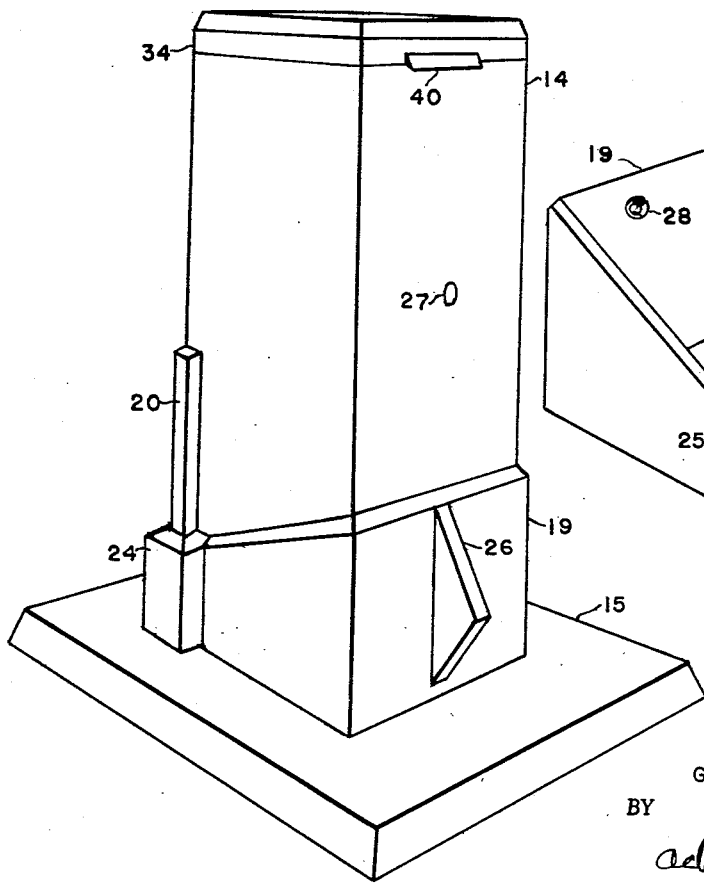
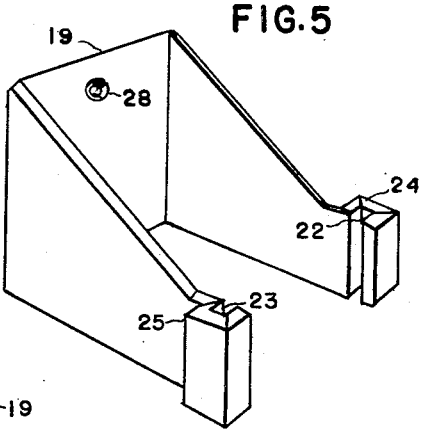
INVENTOR.
GARY DEE BURRELL
BY
Achilles C. Gough
ATTORNEY United States Patent Office 3,151,920
Patented Oct. 6, 1964

3,151,920
SANITARY HOLDER FOR SERVING AND
STORING A PROCESSED FOOD BAR
Gary Dee Burrell, 1054 N. Ewing, Helena, Mont.
Filed Apr. 15, 1963, Ser. No. 273,175
7 Claims. (Cl. 312—35)

This invention relates to sanitary holders for serving and storing processed food, and more particularly to a sanitary holder for serving and storing a bar of processed food having consistency of butter, margarine and cheese, at room temperature and when refrigerated, and has for an object to combine new basic structures and modified old structures to produce an upright holder having a slidable storage cover that provides maximum convenience for serving a bar of processed food at the dining table and for storing same.

Another object is to provide an upright sanitary holder for a bar of processed food wherein minimum storage space is required therefor.

Another object is to provide a sanitary holder for a bar of processed food having a structural interior adapted to receive and deliver said bar to serving position at temperatures ranging from room temperature to that of refrigerator.

Another object is to provide a sanitary holder for a bar of processed food having a structural interior adapted to provide an insulating air space around said bar whereby the storage temperature remains more uniform.

Another object is to provide a sanitary holder for a bar of processed food having a structural interior and exterior can be easily cleansed and kept in a sanitary condition.

Another object is to provide a sanitary holder for a bar of processed food having a structural exterior of a form adapted to receive ornamentation in harmony with varied decor.

Various other objects and advantages of the invention will be apparent as the nature of the invention is more fully disclosed.

In the accompanying drawings are shown novel features and construction of the device according to the present invention;

FIG. 1 is a plan view of the self-contained sanitary holder for a bar of processed food;

FIG. 2 is a left-side elevation corresponding to FIG. 1, showing the slidable storage cover in storage-position;

FIG. 3 is a pictorial view of the device, showing the slidable storage cover in storage-position;

FIG. 4 is a longitudinal vertical sectional view approximately along the line 4—4, FIG. 1, showing the slidable storage cover in serving-position, having enlarged longitudinal and transverse dimensions to better show interior structural relations of said holder;

FIG. 5 is a pictorial view of the slidable storage cover, showing an interior recess adapted to be engaged by a retainer-projection from the front of the upright housing of said holder;

FIG. 6 is a plan view of said holder having the top cover removed to disclose the system of upright lands projecting from the interior of said housing for slidably retaining said bar of processed food, whereby said bar is delivered to serving-position as shown in FIG. 4;

FIG. 7 is an enlarged bottom view of the top cover showing integral depending hinge portions; and FIG. 8 is an enlarged fragmentary longitudinal vertical sectional view of the upper end of said housing disclosing a flexible retainer for retaining said top cover in closed position.

In the following description certain specific terms are used for convenience in referring to various details of the invention. These terms, however, are to be given as broad an interpretation as the state of the art will permit.

The structures incorporated provide a portable sanitary holder for serving and storing a bar of processed food comprise an upright housing having a series of internal projecting lands spaced apart including and otherwise adapted to provide an upright chamber for slidably retaining said bar, and further provides an insulating air space substantially surrounding said bar, a portion of the lower front and sides of said housing being removed to provide a serving space for said bar, detachable means for closing said serving space, attached top cover means for closing top of said upright chamber, and a supporting base integral with the lower rear wall of said housing.

Referring now more particularly to the accompanying drawings, the following is a description thereof wherein like and corresponding parts are designated by similar reference characters.

Preferred forms of these structures are shown, in which the numerals 14 represent said upright housing supported by an integral horizontal base 15, said support being reinforced by a planar part 16 centrally affixed perpendicular to said rear wall and said base. Said housing having a substantial opening 17, FIG. 4, in front and side walls of said housing, the top of said opening sloping substantially downwardly from front to rear wall, said opening constituting a serving space, best shown in FIG. 4.

A detachable storage cover 19 for said serving space 17 is slidably mounted on said housing 14. Upright longitudinal rectangular projections 20 and 21 from the left- and right-hand edge of said rear wall constitute upright guides upon which said storage cover 19 slides. Upright rectangular interior open slots 22, 23 within side terminals 24, 25 of said storage cover are adapted to slidably engage said upright guides 20 and 21, whereby said storage cover 19 is retained in desirable slidable relation with said housing 14. A planar projection 26, of angular outline, from the front of said storage cover 19 provides means for the positioning thereof. A small medial retainer arcual projection 27 extends from the upper front of said housing 14 and a corresponding recess 28 in the upper interior of said cover 19 provide auxiliary means for retaining said cover 19 in raised serving-position, the latter best shown at 17, FIG. 4.

A series of upright parallel lands 29 project from the interior of said housing 14, two integral with said front wall, two integral with said rear wall, and one integral with each said side wall, said lands being spaced apart to provide an upright guide wherein said bar 30 slides freely downward to said serving space 17, said lands 29 having sufficient thickness to provide a substantial insulating air space substantially surrounding said bar 30. The upper ends of said lands 29 are of arcual form and smooth to prevent gouging said bar when loading same within said lands 29, the lower ends of two lands that are integral with said rear wall decrease downwardly in thickness as shown at 31, FIG. 4. The thickness of the lower portion of said rear wall increases as shown at 32, FIG. 4, as required to maintain said bar 30 in upright position under slight pressure of the slicing instrument 33 moving in direction of the arrow 41, FIG. 4. A top cover 34 for said housing 14 has depending hinge portions 35A adapted to pivotally engage a conjunctive hinge portion 35 integral with said housing 14 and the hinge pin 36. Also affixed to interior of said cover 34 is a flat flexible member 37 having terminal 38 of a form adapted to frictionally engage a projection 39 from the upper interior of said housing 14, the frictional engagement of said parts being adapted to retain said top cover 34 in closed relation with said housing 14, best shown in FIG. 8. Said cover 34 is placed in open position, FIG. 4, by means of the forward projection 40, by upward pressure of a finger, the latter not shown.

When a pat has been sliced from said bar 30 by an instrument 33 moving in the direction of arrow 41, FIG. 4, said pat swings downward to lie upon said base, as shown by dotted lines 30″, from whence it is removed as desired. When the greater portion of said bar 30 has been sliced-off, another bar is placed within said housing as indicated by dotted lines 30′ in FIG. 4, whereby the slicing operation may continue.

Said lands 29 require definite dimensions, to slidably support said bar 30 and to provide insulating air space between said bar and said housing. Lands having a cross-section of 3/32 x 3/32 inches have proved satisfactory for handling a food bar having a 1¼ x 1¼ inch cross-section.

Before storing said holder it is necessary to place said slidable storage cover in storage-position as shown in FIGS. 2 and 3 and said top cover 34 in closed position as shown in FIG. 8. This prevents circulation of the air which is within the insulation space 42 surrounding said bar 30, the latter being best shown in FIG. 6. When said space 42 is properly closed by said covers 19 and 34 the insulating effect of said air space will permit storage on an open shelf at room temperature as high as 80 degrees F., and permits storage at lower temperature in refrigerator.

Before washing and cleaning said holder it is desirable to remove said storage cover 19, which is done as follows: Grasp said part 26 between thumb and fingers (latter not shown) and raise same above the elevation indicated by line 43, FIG. 2 and sliding-off said housing in direction of arrow 44.

Until other standards of shape and sizes of processed food bars have been established, the upright space between said lands 29 must be of capacity adapted to slidably support a full bar of standard size as indicated by dotted lines 30′ and a small portion 30 of the bar being sliced, whereby said processed food bar 30 is maintained ready for continual slicing. To provide optimum convenience for serving said bar 30 on the dining table and storing same on a shelf or refrigerator requires a housing structure that incorporates a serving space, as at 17, FIG. 4, a slidable storage cover 19, and a top cover such as member 34 of forms adapted to be kept in sanitary condition. Beyond maximum convenience, the combination of structures incorporated in said sanitary food holder for said bar 30 provides maximum economy in storage space and in cost of production, to be achieved through proper selection of materials and design.

Several varieties of plastic in current use, hard and soft, provide extraordinary advantages for storing at wide temperature range due to high insulating properties of plastic. Metals lack the insulating properties of plastic, otherwise several current types of metals can be used to advantage in construction of said holder. In order to achieve said insulating advantages said cover 34 must be kept snugly closed and said sliding storage cover 19 must have uniform contact around said housing 14, snugly enough that said cover 19 will remain in any relative position where it is placed upon said housing by a force in the direction of arrow 45, FIG. 2, to be achieved by grasping said part 26 at a medial point between thumb and fingers (the latter not shown) while the other hand presses down upon said top 34 or said base 15. In case said sliding cover does not remain in raised serving-position shown in FIG. 4, a continued force but in the direction of arrow 46 will lift the flexible cover 19 and cause said recess 28 to engage said arcual projection 27, shown by dotted lines 19, FIG. 2, whereby said member 19 will be retained at the slightly higher elevation.

The various parts of the present structural combination are capable of considerable modification, therefore, such modifications as come within the scope of the appended claims are deemed to be a part of the present invention.

I claim:

1. A portable sanitary holder for serving and storing a bar of processed food comprising an upright housing having a substantial opening constituting a serving space in lower front and side walls thereof, top of said opening sloping substantially downward from said front wall to the rear wall of said housing, said housing being supported by its rear wall affixed to an horizontal base, said support being reinforced by a planar part centrally affixed perpendicular to said rear wall and to said base, a storage cover for said serving space slidably mounted on said housing, an upright longitudinal rectangular projection from the left- and right-hand edge of said rear wall constituting upright guides for said storage cover, upright rectangular open slots within the side terminals of said storage cover adapted to slidably engage said upright guides, means for positioning said storage cover, means for retaining said storage cover in raised serving position, a top cover for said housing having hinge means for mounting thereon, means for retaining said top cover in closed position, and a series of substantially long upright lands projecting from interior of said housing of suitable form and spaced apart to constitute a container and freely slidable guide for said bar of processed food, said lands having sufficient thickness to provide an insulating air space around said bar of processed food.

2. A portable sanitary holder for serving and storing a bar of processed food as claimed in claim 1 wherein said means for positioning said storage cover comprises a planar projection from front thereof having an angular outline.

3. A portable sanitary holder for serving and storing a bar of processed food as claimed in claim 1 wherein said means for retaining said storage cover in raised serving position comprise a medial arcual projection from front of said housing and a corresponding recess in upper interior of said storage cover adapted to frictionally engage said medial arcual projection.

4. A portable sanitary holder for serving and storing a bar of processed food as claimed in claim 1 wherein said hinge means comprise an outward central projection from upper end of said rear wall constituting a central hinge portion, depending projections from said top cover spaced apart to pivotally engage said central hinge portion, and a hinge pin pivotally connecting said hinge portions.

5. A portable sanitary holder for serving and storing a bar of processed food as claimed in claim 1 wherein said means for retaining said top cover in closed position comprise an interior projection from upper interior of said housing and a flat flexible member affixed to upper interior of said top cover having a terminal portion adapted to frictionally engage said interior projection.

6. A portable sanitary holder for serving and storing a bar of processed food as claimed in claim 1 wherein said series of upright lands projecting from interior of said housing comprise six rectangular parts spaced apart as shown, two integral with said rear wall, two integral with said front wall, and one integral with each said side wall, said lands having sufficient thickness to provide an insulating air space substantially surrounding said bar of processed food.

7. A portable sanitary holder for serving and storing a bar of processed food comprising an upright housing having a series of internal projecting lands spaced apart and otherwise adapted to provide an upright chamber for slidably retaining said bar and further providing an insulating air space substantially surrounding said bar, a portion of the lower front and sides of said housing being removed to provide a serving space for said food bar, detachable cover means for closing said serving space, attached top cover means for closing top of said upright chamber, and a supporting base integral with the lower rear wall of said housing.

References Cited in the file of this patent

UNITED STATES PATENTS

| | | |
|---|---|---|
| 2,295,313 | Weir | Sept. 8, 1942 |
| 2,692,429 | Schweller et al. | Oct. 26, 1954 |
| 2,978,809 | Dunnet | Apr. 11, 1961 |